United States Patent Office 3,250,815
Patented May 10, 1966

3,250,815
BICYCLO (2.2.1) HEPTYL CARBINOLS
William J. Houlihan, Colonia, N.J., assignor, by mesne assignments, to Universal Oil Products Company, Des Plaines, Ill., a corporation of Delaware
No Drawing. Filed Feb. 5, 1962, Ser. No. 171,262
2 Claims. (Cl. 260—617)

This invention relates to new olfactory compounds and particularly to substituted bicyclo (2.2.1) heptyl carbinols and their esters, to processes for their preparation and to compositions containing these compounds.

Dihydrosantalol is a natural oil obtained from sandalwood and is used widely in compounding perfumes, soaps and similar olfactory products. As with most naturally occurring products, as contrasted with synthetic materials, the odor can vary widely depending on the source of the material, method of extraction and harvest time. In addition, the stability of the product can also vary due in part to the presence of impurities. Because of the unusual structural formula of the compound, it has not as yet been synthesized. The desirability of having a synthetic material possessing a similar odor is readily apparent.

An object of the invention is to provide novel aromatic compounds which possess desirable olfactory properties. Another object of the invention is to provide a simple and economical process for producing such compounds synthetically in high yield. A further object is to provide compositions of unique and stable olfactory properties. Other objects and the advantages of the invention will appear from the following detailed description.

In accordance with the invention, it has been discovered that woody, earthy type odors are possessed by bicyclo (2.2.1) heptyl carbinols and their esters having the general formula

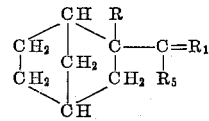

wherein R is hydrogen or a lower alkyl group containing from one to three carbon atoms, $R_1$ is an oxygen atom forming a keto group or

wherein $R_2$ is hydrogen or a lower alkyl group containing from one to three carbon atoms and $R_3$ is a hydroxy group or

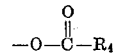

wherein $R_4$ is a lower alkyl group containing from one to three carbon atoms, and $R_5$ is a saturated or unsaturated isoamyl group.

The compounds of the invention are prepared by reacting a 2-acyl-2-R-bicyclo (2.2.1) heptane (Compound I) with a Grignard reagent of the formula R"MgX to produce the corresponding bicyclo (2.2.1) heptyl carbinol (Compound II). This latter compound can be hydrogenated to produce the corresponding-diene (Compound III) or to produce the corresponding-ene (Compound IV). These latter compounds can be oxidized to produce the corresponding ketones (Compounds V and VI) when R' is hydrogen and acylated to produce the corresponding esters (Compounds VII and VIII). These steps can be chemically represented as follows:

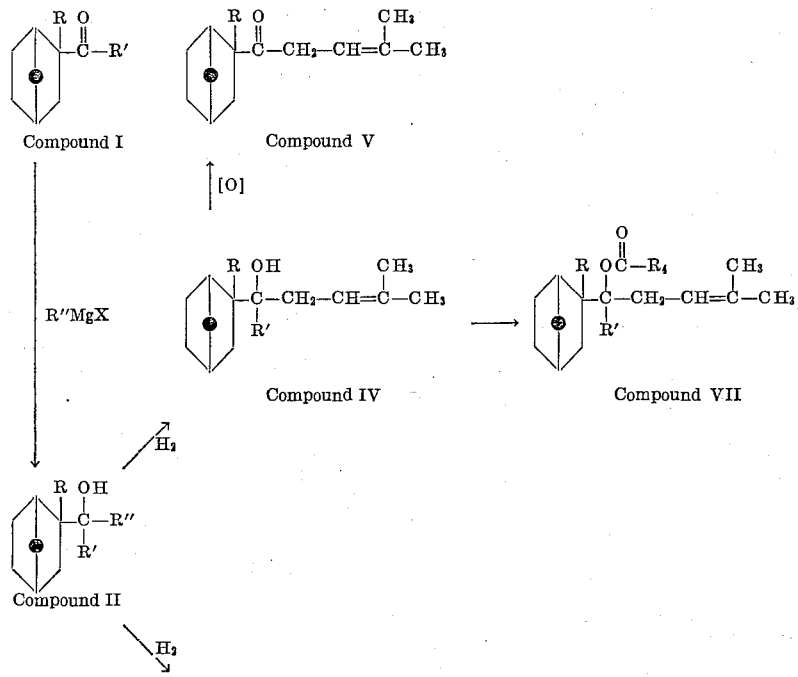

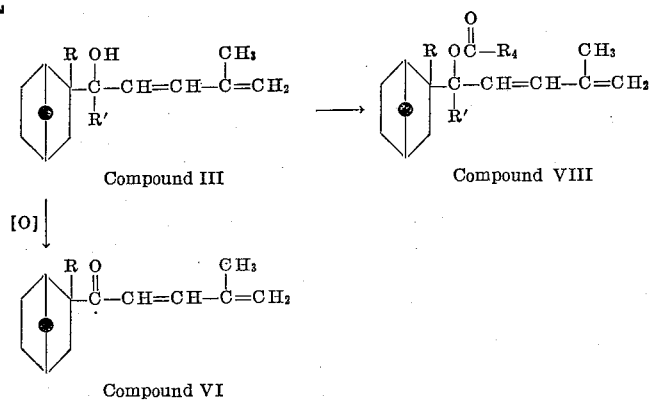

Compound III → Compound VIII

[O] ↓

Compound VI wherein R' is a hydrogen or a lower alkyl group, R" is saturated or unsaturated isoamyl group, X is a halo group and R is as indicated above.

The bicyclo (2.2.1) heptyl carbinol is prepared by reacting a Grignard reagent of the formula R"MgX wherein X is a halo group such as a chloro, bromo, or iodo group and R is a saturated or unsaturated isoamyl group with a 2-acyl-2-R-bicyclo (2.2.1) heptane. The reaction is preferably carried out in a suitable solvent such as an ether, as for example methyl ethyl ether, diethyl ether, methyl propyl ether and the like. Conventionally, the Grignard reagent is freshly formed by reacting an ethyl halide such as ethyl bromide with magnesium and an ether solution of the particular isoamyl compound selected. The reaction is complete when the solution ceases to give off ethane. The 2-acyl-2-R-bicyclo (2.2.1) heptane is added to the reaction mixture in a solvent such as an ether. The reaction is conveniently carried out at a temperature of about −5° C. to about 25° C. and require about one to three hours for completion. Aqueous ammonium chloride is added to the reaction mixture to hydrolyze the complex. The product can be recovered by filtering and drying, followed by distillation of the reaction mixture. Typical examples of suitable starting materials are 2-formyl bicyclo (2.2.1) heptane; 2-formyl-2-methyl bicyclo (2.2.1) heptane; 2-formyl-2-ethyl bicyclo (2.2.1) heptane; 2-formyl-2-propyl bicyclo (2.2.1) heptane; 2-formyl-2-isopropyl bicyclo (2.2.1) heptane; 2-acetyl bicyclo (2.2.1) heptane; 2-propinoyl-2-methyl (2.2.1) heptane; 2-acetyl-2-propyl bicyclo (2.2.1) heptane, 2-isopropionyl-2-ethyl bicyclo (2.2.1) heptane and 2-acetyl-2-isopropyl bicyclo (2.2.1) heptane. The Grignard reagents are prepared utilizing 2-methylbut-1-en-3yne or isoamyl chloride as the starting material.

When the Grignard reagent used is formed from 2-methylbut-1-en-3yne, the product is the corresponding 2-(4'-methylpent-2'-yne-4'-ene-1'-ol)-bicyclo (2.2.1) heptane. This product can be hydrogenated with a lindlar catalyst such as palladium on a barium or strontium carrier to produce the corresponding 2-(4'-methylpenta-2',4'-diene-1'-ol) derivative or with a palladium catalyst to produce the corresponding 2-(4'-methylpent-3'-ene-1'-ol) derivative. The hydrogenation reactions are preferably carried out in an alcoholic solvent such as ethanol, isopropanol and the like at a temperature of about 25° C. to about 50° C. The reaction usually requires about 20 minutes to two hours for completion. The hydrogenation catalyst is preferably used in the range of about 0.5 to about 10% by weight based on the weight of the starting material although additional amounts can be used. The reaction can be carried out by using hydrogen at normal atmospheric, sub-atmospheric, or super-atmospheric pressure. The product is conveniently recovered by filtering the mixture to remove the catalyst and subjecting the reaction mixture to distillation.

The bicyclo (2.2.1) heptyl carbinols can be converted to the corresponding esters by treating with an acylating agent. Suitable acylating agents include the organic acids, their halides and acid anhydrides. Typical of such agents are acetyl chloride and propionyl chloride. It is usually preferred to use an excess of acylating agent and to carry the reaction out in a solvent medium. The reaction proceeds most favorably at a temperature of about −5° C. to about 115° C. and requires about one hour to about eight hours to complete. The product can be conveniently recovered by washing with water, drying and then distilling.

The bicyclo (2.2.1) heptyl carbinols can also be oxidized to produce the corresponding ketone. This reaction can be conveniently carried out by subjecting the compound to the action of an alkali metal dichromate or chromic acid in the presence of acetic acid, sulfuric acid or phosphoric acid. The reaction is preferably carried out in a solvent such as an organic acid, water or the like. The reaction temperature is not critical but it is preferably carried out at a temperature of about 25° C. to about 75° C. Typical of the compounds which can be prepared in this manner are 2-(4'-methylpent-2'-yne-4'-ene-1'-one) bicyclo (2.2.1) heptane; 2-methyl-2-(4'-methylpene-2'-yne-4'-ene-1'-one)-bicyclo (2.2.1) heptane; 2-methyl-2-(4' - methylpene - 2',4' - diene-1'-one)-bicyclo (2.2.1) heptane; 2-(4'-methylpene-3'-ene-1'-one)-bicyclo (2.2.1) heptane; 2-methyl-2-(4'-methylpentan - 1' - one)-bicyclo (2.2.1) heptane; 2-ethyl-2-(4'-methylpent-2',4'-diene-1'-one)-bicyclo (2.2.1) heptane; and 2-isopropyl-2-(4'-methylpentan-1'-one)-bicyclo (2.2.1) heptane.

The 2-alkyl-bicyclo (2.2.1) heptane starting material is prepared by reacting $\Delta^{1,3}$-cyclopentadiene with α-methyl acrolein to produce 2-formyl-2-methyl-bicyclo (2.2.1) hept-5-ene which is then hydrogenated in the presence of a platinum, palladium or a nickel catalyst to produce the corresponding saturated heptane. As is apparent, in place of α-methyl acrolein any of the α,β-unsaturated ketones or aldehydes can be used in like manner. The aldehyde or ketone can be substituted in the α or β position with a lower alkyl group.

The following examples are given for purposes of illustration:

Example I

A Grignard reagent is prepared from ethyl bromide (55 g., 0.5 mole) and magnesium (12.2 g., 0.5 mole) in diethyl ether (500 g.). With good stirring a solution of 2-methylbut-1-ene-3-yne (33 g., 0.5 mole) in diethyl ether (100 g.) is added dropwise in 0.75 hour. Gassing (ethane) is observed at the start of addition and continues for about 4.5 hours. A solution of 2-methyl-2-formyl bicyclo (2.2.1) heptane (56 g., 0.4 mole) in diethyl ether (100 ml.) is added rapidly. The mixture is refluxed 1.5 hours and then allowed to stand overnight at room temperature. The complex is hydrolyzed with saturated ammonium chloride, filtered and dried. Distillation through a claisen head gives 55.5 g. (67.3%) of 2-methyl-2-(4'-methylpent-2'-yne-4'-ene-1'-ol) bicyclo (2.2.1) heptane, B.P. 118–122° C. at 3mm., $n_D^{25.5}$ 1.5150, characteristic IR brands at 2.95, 4.50, 6.18, 7.2% and 11.24μ. The compound has an earthy-green, sweet, slight anise note.

*Example II*

A solution of 2-methyl-2-(4'-methyl-pent-2'-yne-4'-ene-1'-ol)-bicyclo (2.2.1) heptane (15.2 g., 0.075 mole), Ionol (one crystal), and isopropanol (20 ml.) is hydrogenated in the presence of a lindlar catalyst (0.050 g.) at 25.5° and an initial pressure of 26.2 p.s.i. After 1.0 molar equivalents of hydrogen is absorbed (1.5 hrs.) the reaction is filtered and distilled. There is obtained 12.8 g. (81%) of 2-methyl-2-(4'-methylpenta-2',4'-diene-1'-ol)-bicyclo (2.2.1) heptane, B.P. 107–108° C. at 2.0 mm., $n_D^{27}$ 1.4968. The compound has an earthy-green, sweet, slight anise odor.

*Example III*

A solution of 2-methyl-2-(4'-methylpent-2'-yne-4'-ene-1'-ol)-bicyclo (2.2.1) heptane (15.2 g., 0.075 mole), Ionol (one crystal) and isopropanol (35 ml.) is hydrogenated in the presence of 5% palladium-carbon catalyst (1.0 g.) at 24° and initial pressure of 27.0 p.s.i. The temperature is not allowed to exceed 30° during hydrogen-uptake. After 2.0 molar equivalents of hydrogen is absorbed (0.5 hr.) the reaction is cooled, filtered and distilled. There is obtained 11.1 g. (72%) of 2-methyl-2-(4'-methylpent-3'-ene-1'-ol) bicyclo (2.2.1) heptane, B.P. 104–110° C. at 2.0 mm. $n_D^{25.5}$ 1.4846. The compound has an earthy-green, sweet, slight anise note.

*Example IV*

A Grignard reagent was prepared from isoamyl chloride (63 g., 0.60 mole) magnesium (14.5 g., 0.60 mole) in diethyl ether (300 ml.). The reagent is cooled in an ice bath and then treated with a solution of 2-methyl-2-formyl-bicyclo (2.2.1) heptane (27.6 g., 0.20 mole) in diethyl ether (100 ml.). After standing overnight at room temperature, the complex is hydrolyzed with saturated ammonium chloride, filtered and dried. Distillation gives 2-methyl-2-(4'-methyl pentan-1'-ol)-bicyclo 2.2.1) heptane, B.P. 105–108° C. at 2 mm. $n_D^{25}$ 1.4786. The compound has a green, sweet odor.

As indicated above, the compounds of the invention have a green earthy odor which is refreshingly woodlike. They can find wide application in a variety of products, particularly in perfume and cologne of the oriental type. A typical formula for a perfume is as follows:

*Example V*

| | Parts |
|---|---|
| Amyl bicyclo (2.2.1) heptylcarbinol | 20.00 |
| Methyl eugenol | 10.00 |
| 50% oakmoss absolute | 7.50 |
| Diphenyl oxide | 5.00 |
| 50% galbanum resinoid | 2.50 |
| Octyl isobutyrate | 2.50 |
| Gamma-heptanolide | 2.50 |
| 5% dibutyl sulfide | 0.75 |
| Geranium Moraccan | 0.51 |
| Octyl acetate | 1.25 |

*Example VI*

Approximately 20 grams of unperfumed standard #1 soap stock and 0.2 gram of the formula of Example V is placed in a mortar and milled until the soap is reduced to a fine powder. About two ml. of distilled water is then added and the mixture milled again to produce a plastic mass. The soap thus prepared is put into a tabletting die and pressed in a hand arbor to produce a square cake. The cake had the freshness of a cologne with an excellent woody, earthy odor which remained over an extended period.

While the compounds of the present invention have a definite configuration, it will be apparent from the foregoing description that they can be modified without departing from the spirit and scope of the invention. It will also be apparent that the methods of production and use can be varied considerably and that the compounds can be employed in various compounded and blended combinations.

Any departure from the foregoing description which conforms to the invention is intended to be included within the scope of the claims.

What is claimed is:
1. 2 - lower - alkyl - 2-(4'-methylpent-2'-yne-4'-ene-1'-ol)-bicyclo (2.2.1) heptane.
2. 2 - methyl - 2 - (4'-methylpent-2'-yne-4'-ene-1'-ol)-bicyclo (2.2.1) heptane.

References Cited by the Examiner
UNITED STATES PATENTS
2,894,983   7/1959   Arnold et al. _____ 260—617 X JOSEPH R. LIBERMAN, *Primary Examiner.*

CHARLES B. PARKER, LEON ZITVER,
*Examiners.*

A. H. SUTTO, J. M. BANE, T. G. DILLAHUNTY,
*Assistant Examiners.*